United States Patent [19]

Zettier et al.

[11] Patent Number: 5,260,079
[45] Date of Patent: Nov. 9, 1993

[54] METHOD OF AND EQUIPMENT FOR CONTROLLING THE CONTENT OF FAT IN MILK

[75] Inventors: Karl-Heinz Zettier; Werner Hanschmann, both of Oelde; Wolfgang Wieking, Lette, all of Fed. Rep. of Germany

[73] Assignee: Westfalia Separator AG, Oelde, Fed. Rep. of Germany

[21] Appl. No.: 977,334

[22] Filed: Nov. 17, 1992

[30] Foreign Application Priority Data

Nov. 29, 1991 [DE] Fed. Rep. of Germany ....... 4139380

[51] Int. Cl.⁵ .................... A23C 9/00; G01N 33/00
[52] U.S. Cl. .................... 426/231; 99/452; 99/456; 426/491
[58] Field of Search ............ 426/231, 491, 586; 99/452, 456; 210/96.1, 745

[56] References Cited

U.S. PATENT DOCUMENTS

| | | | |
|---|---|---|---|
| 4,075,355 | 2/1978 | Pato | 426/231 |
| 5,137,738 | 8/1992 | Wynn | 426/231 |

FOREIGN PATENT DOCUMENTS 2531141 1/1977 Fed. Rep. of Germany.

*Primary Examiner*—George Yeung
*Attorney, Agent, or Firm*—Sprung Horn Kramer & Woods

[57] ABSTRACT

A method of and equipment for controlling the content of fat in milk. Whole milk is separated into skim milk. Some of the cream is returned to the skim milk to create a standardized milk. The standardized milk is employed to derive a parameter that dictates how much cream is to be added. The fat contents detected in the standardized milk are exploited to vary the amount of added cream. The density of the skim milk is measured at intervals and the results are stored. The density of the standardized milk is measured and more or less cream is added until a prescribed difference between the skim milk and the standardized milk, corresponding to the desired fat content in the standardized milk, is obtained. The density of the skim milk and that of the standardized milk are measured in the same sensor. The result of each measurement of the density of the skim milk is compared with the stored result. When there is a discrepancy between the two results, the most recently measured result is stored instead of the previously stored result. How much cream is added is controlled in accordance with a density difference that varies with the discrepancy.

7 Claims, 2 Drawing Sheets

METHOD OF AND EQUIPMENT FOR CONTROLLING THE CONTENT OF FAT IN MILK

BACKGROUND OF THE INVENTION

The invention concerns a method of controlling the content of fat in milk. Whole milk is separated into skim milk and cream. Some of the cream is returned to the skim milk to create a standardized milk. The standardized milk is then employed to derive a parameter that dictates how much cream is to be added. The fat contents detected in the standardized milk are exploited to vary the amount of added cream. The density of the skim milk, however, is also measured at intervals and the results are stored. The density of the standardized milk is then measured and more or less cream is added until a prescribed difference between the skim milk and the standardized milk, corresponding to the desired fat content in the standardized milk, is obtained.

A method of this type is known from German OS 2 531 141. The densities of the skim milk and cream leaving a centrifuge are detected by two separate sensors. Some of each liquid flows through the sensors. The two currents subsequently rejoin the mainstream. How much cream to add to the skim milk in order to obtain a particular fat content in the standardized milk accordingly depends on the empirical difference between the densities of the two liquids.

Density, however, depends not only on fat content but also on such non-fat solids as proteins, sugar, minerals etc. and on temperature. Measuring the density of the skim milk and that of the standardized milk and calculating the difference between them is intended in this known process to eliminate all factors other than fat content such that the difference between the results will depend only on the difference between the fat content of the skim milk and that of the standardized milk. Since the same product is theoretically flowing through both sensors, it is assumed that establishing a difference in density that represents the desired content of fat in the standardized milk will also maintain that content constant.

Using two sensors, however, necessarily entails two basic sources of error. One source comprises manufacturing tolerances that lead to discrepancies between the results obtained from the two sensors even when the products flowing through them are equally dense. The other source is the difference in on-site fluidics that derives from the alignment between the two sensors, necessitating a pressure difference to ensure flow. When the products, as is common with milk, contain air, the air will lead to different density readings in the event of pressure differences, even though the fat content does not differ.

Still other errors can derive from variations in the fat content of the skim milk throughout an operating cycle. Such variations can occur for example as the result of reductions in the centrifuge's separating efficiency, of the presence of homogenized milk in the milk being skimmed, and of different percentages of air in the whole milk. The difference in density detected by the first and the second sensor will no longer ensure the desired fat content in the standardized milk.

SUMMARY OF THE INVENTION

The object of the present invention is a more precise method of controlling the fat content of the standardized milk at less expenditure of equipment and controls.

This object is attained as will now be described. The density of the skim milk and that of the standardized milk are measured in the same sensor. The result of each measurement of the density of the skim milk is compared with the stored result. When there is a discrepancy between the two results, the most recently measured result is stored instead of the previously stored result. How much cream is added is now controlled in accordance with a density difference that varies with the discrepancy.

Since the method in accordance with the invention necessitates only one sensor to measure the density of the skim milk and that of the standardized milk, the equipment will be less expensive, and manufacturing tolerances and differences in fluidics will be similarly oriented, generating no errors in the differences between the two results. Furthermore, no constant difference between the density of the skim milk and that of the standardized milk is exploited, but every measurement detects whether the difference still corresponds with the previously measured skim-milk difference. An appropriate correction in the computer allows the method to considerably increase the requisite precision in establishing the fat content of the standardized milk.

One advantageous embodiment of the method is characterized in that, in controlling how much cream is added, a correction factor is taken into consideration that compensates for any alteration in the protein content of the standardized milk at various fat contents.

Restoring some of the cream removed from the whole milk to the skim milk displaces the solids in the standardized milk in that cream also includes milk constituents to a percentage that depends on the concentration of fat. In producing standardized milk with different fat contents, different amounts of cream are diverted, meaning that different protein contents are also extracted. Different percentages of protein are accordingly added to the standardized milk along with the cream. Since the percentage of protein in the skim milk is no longer equal to that of the protein in the standardized milk, there will be errors in measuring the fat content of the standardized milk on the basis of measured density. These errors will be compensated for by the correction factor.

The equipment for carrying out the method includes a centrifuge with an intake line for whole milk, an outlet line for skim milk, and an outlet line for cream. The equipment also includes a line between the cream-outlet line and the skim-milk outlet line. It is characterized in accordance with the invention as follows. A bypass line that accommodates a shut-off valve branches off from the skim-milk outlet line. Another bypass line that accommodates a shut-off valve branches off from a line that conveys standardized milk. Both bypass lines communicate with a recirculation line. The recirculation line accommodates a single sensor that the measures the density of both the skim milk and the standardized milk.

Further advantageous embodiments are recited in the subsidiary claims.

One embodiment of the invention will now be specified with reference to the accompanying drawing, wherein

DETAILED DESCRIPTION OF THE INVENTION

Figure 1:
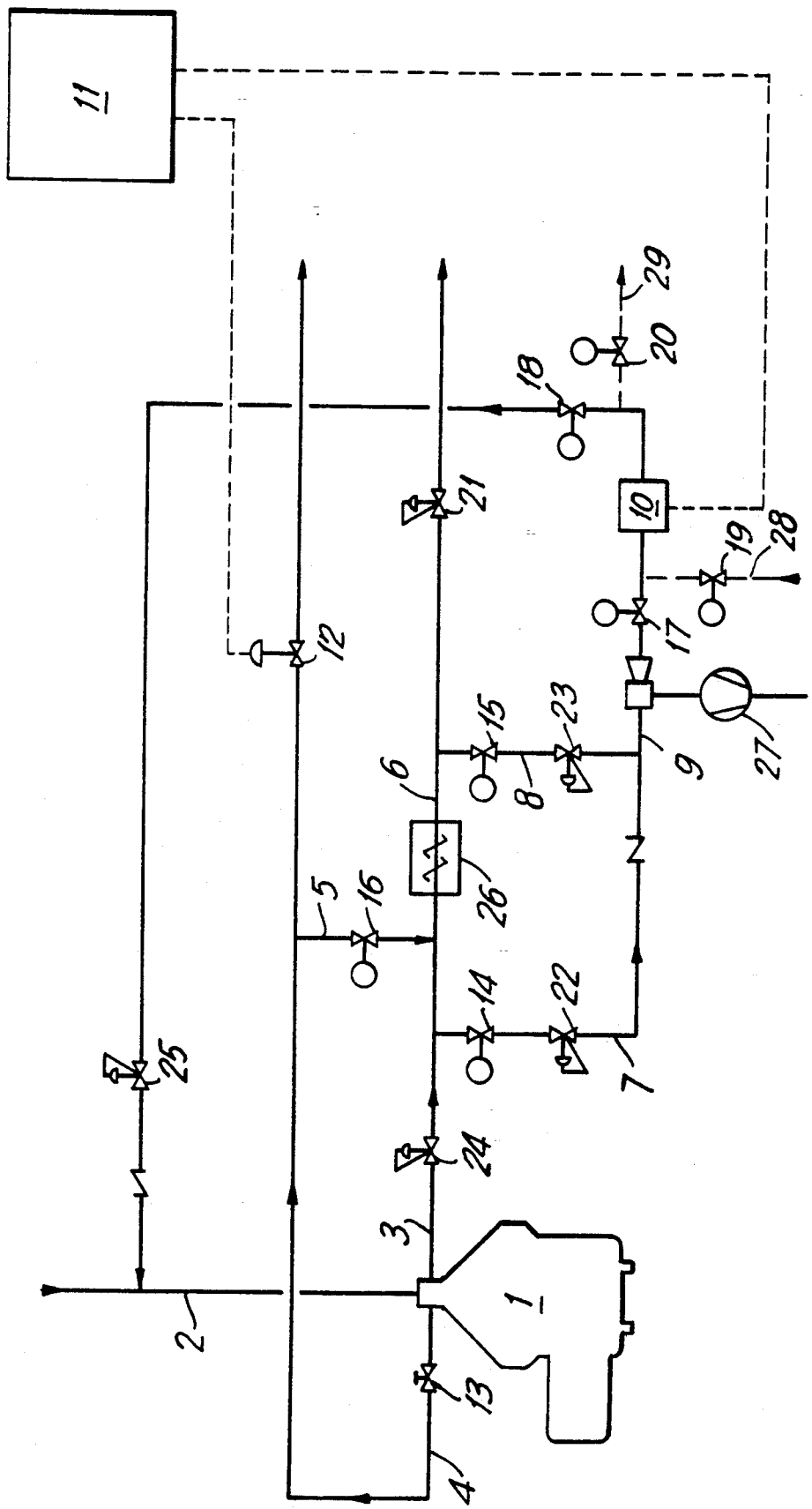
FIG. 1 is a schematic representation of the equipment in accordance with the invention and FIG. 2 illustrates the distribution of protein in standardized milk at various fat contents.

The centrifuge 1 illustrated in FIG. 1 has an intake line 2 for whole milk, an outlet line 3 for skim milk, and an outlet line 4 for cream. Branohing off of cream-outlet line 4 is a mixing line 5. Mixing line 5 communicates in conjunction with skim-milk outlet line 3 with a line 6 for standardized milk. A bypass line 7 extends out of skim-milk outlet line 3. Another bypass line 8 extends out of standardized-milk line 6. Lines 7 and 8 extend into a recirculation line 9. Recirculation line 9 communicates with whole-milk intake line 2. Recirculation line 9 accommodates a sensor 10 connected to controls 11. Controls 11 are in turn connected to a valve 12 in cream-outlet line 4. Valves 13 to 20 vary and interrupt the flow of liquid through their associated lines. Devices 21 through 25 maintain constant flow and pressure.

Whole milk is supplied to centrifuge 1 through intake line 2 and separated into skim milk and cream. The centrifuge's separating precision is adjusted by way of valves 13 and 24. Once controls 11 have been activated, they open valve 14, diverting some of the skim milk to recirculation line 9 through first bypass line 7. The density of the skim milk is measured by sensor 10. The result is stored in controls 11 and a difference associated with it. Controls 11 now close the valve 14 in first bypass line 7 and open valve 15 in second bypass line 8, diverting some standardized milk out of line 6 and into sensor 10 by way of recirculation line 9.

Controls 11 now activate the valve 12 in cream-outlet line 4, adding enough cream to the skim milk in line 3 through mixing line 5 to ensure that the density of the standardized milk in line 6 will equal the aforesaid difference. The valve will be maintained in that state for a prescribed interval, subsequent to which controls 11 will reverse valves 14 and 15 and reinstitute measurement of the skim milk.

If there is no change in the skim milk's density, the stored result will continue as a basis for adjusting valve 12. If a discrepancy from the previously measured density is detected, however, the new result will be stored in association with a different density difference and controls 11 will activate valve 12 to generate the new difference.

Since the density of the skim milk is verified only discontinuously, brief and insignificant malfunctions at the skim-milk end will not directly occasion any errors.

The density of the liquids flowing through the sensor is measured independent of any oscillations in pressure in downstream equipment because recirculation line 9 extends into whole-milk intake line 2, which is subject to constant pressure. Recirculation line 9 can on the other hand extend into an unillustrated storage tank upstream of the centrifuge.

Standardized-milk line 6 accommodates a blender 26 that ensures thorough mixture of the skim milk with the cream arriving through mixing line 5.

Recirculation line 9 accommodates a vacuum pump 27 upstream of sensor 10. Vacuum pump 27 comes into operation when the stored result is exceeded to too great and extent.

Controls 11 activate an alarm when certain thresholds are exceeded. The alarm can for example be occasioned by deposits on probes in sensor 10. Sensor 10 can then, once valves 17 and 18 have closed and the valves 19 and 20 in lines 28 and 29 opened, be rinsed out with a rinse. The system does not need to be stopped for this operation.

Figure 2:
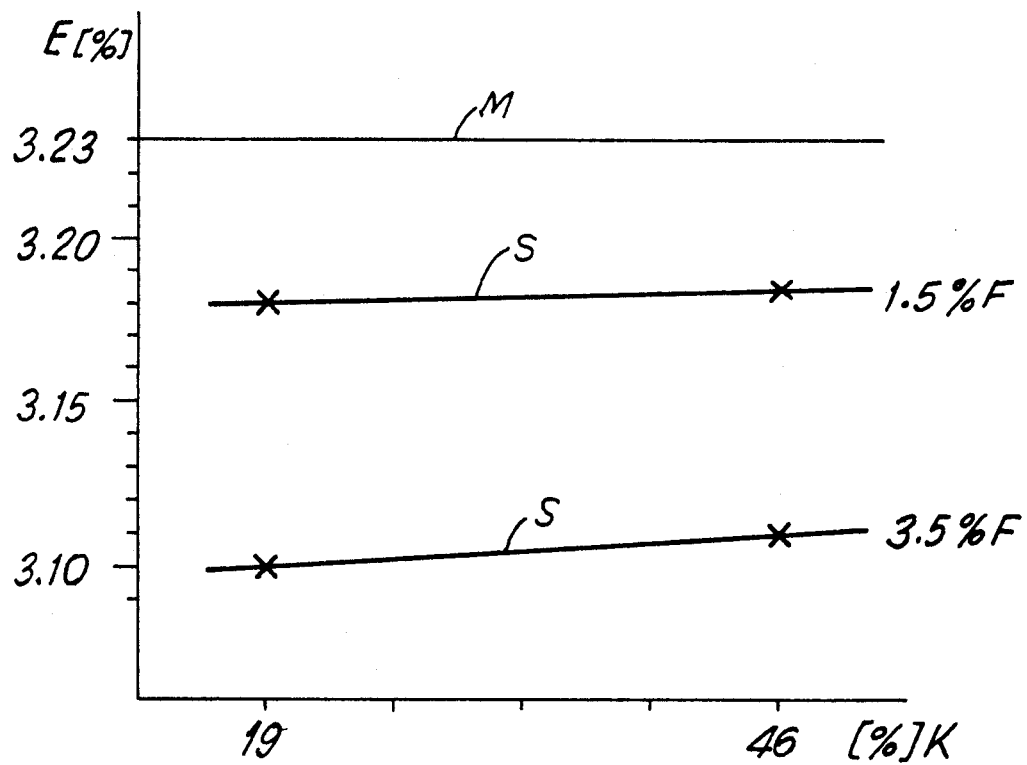

It will be evident from FIG. 2 that the content E of protein in standardized milk S will vary, specifically in accordance with the concentration K of cream and with the fat content F of the milk. The resulting errors are compensated for with an appropriate correction factor in controls 11. Skim milk M acts as a reference.

What is claimed is:

1. A method of controlling the content of fat in milk, comprising the steps of: separating whole milk into skim milk and cream; returning a portion of the cream to the skim milk to create a standardized milk; deriving a parameter that dictates how much cream is to be added; detecting the fat content in the standardized milk to vary the amount of added cream; measuring the density of the skim milk with a sensor at intervals and storing the measured skim milk density results; measuring the density of the standardized milk with the same sensor as that for the skim milk; adding more or less cream until a prescribed difference between the skim milk and the standardized milk, corresponding to the desire fat content in the standardized milk, is obtained by comparing the result of each measurement of the density of the skim milk with the stored skim milk density, and when there is a discrepancy between the two, storing the most recently measured skim milk density instead of the previously stored skim milk density, and controlling how much cream is added in accordance with a density difference that varies with the discrepancy.

2. The method as in claim 1, further comprising compensating for variations in the protein content of the standardized milk at various fat contents and cream concentrations while controlling the added cream.

3. The method as in claim 1, further comprising triggering a visual and/or audible signal when measurement of the density of the skim milk indicates that prescribed thresholds have been exceeded.

4. An apparatus for controlling the content of fat in milk, comprising: a centrifuge with an intake line for whole milk, an outlet line for skim milk, and an outlet line for cream, a mixing line branching off of the cream-outlet line, a first bypass line extending out of the skim-milk outlet, a standardized milk line extending from the first bypass line, a second bypass line extending out of the standardized-milk line, shut-off valves in the bypass lines, and a recirculation line extending from the bypass lines and in communication with the whole-milk intake line and a single sensor in the recirculation line for measuring the density of the skim milk and that of the standardized milk.

5. The apparatus as in claim 4, wherein the bypass lines have means for maintaining a constant flow.

6. The apparatus as in claim 4, wherein the recirculation line has rinse lines in the vicinity of the sensor.

7. The apparatus as in claim 4, wherein the recirculation line has a means for maintaining constant pressure.

* * * * *